(12) United States Patent
Rhim et al.

(10) Patent No.: US 11,851,349 B2
(45) Date of Patent: Dec. 26, 2023

(54) CONTROLLED-TYPE, NON-DECOMPOSABLE, HIGH-CONCENTRATION PROCESS WATER FREEZE-SEPARATION APPARATUS

(71) Applicant: Yoonjin Environment Co., Ltd, Busan (KR)

(72) Inventors: Jung-A Rhim, Busan (KR); Jeong-hyo Yoon, Busan (KR); Mal-suk Ko, Busan (KR); Gi-hoon Lee, Busan (KR); Kwangsoo Noh, Busan (KR); Gunpio Lee, Busan (KR)

(73) Assignee: YOONJIN ENVIRONMENT CO., LTD, Busan (KR)

( * ) Notice: Subject to any disclaimer, the term of this patent is extended or adjusted under 35 U.S.C. 154(b) by 197 days.

(21) Appl. No.: 17/563,503

(22) Filed: Dec. 28, 2021

(65) Prior Publication Data

US 2022/0259074 A1 Aug. 18, 2022

(30) Foreign Application Priority Data

Feb. 17, 2021 (KR) .......................... 10-2021-0021770

(51) Int. Cl.
*C02F 1/22* (2023.01)
*F25B 43/00* (2006.01)

(52) U.S. Cl.
CPC ............... *C02F 1/22* (2013.01); *F25B 43/00* (2013.01); *C02F 2201/002* (2013.01)

(58) Field of Classification Search
CPC ...... C02F 1/22; C02F 1/008; C02F 2201/002; F25B 43/00; F25B 41/00;
(Continued)

(56) References Cited

U.S. PATENT DOCUMENTS

| 6,233,962 B1 * | 5/2001 | Scherer .................. C02F 11/13 62/356 |
| 2010/0282435 A1 * | 11/2010 | Yabuuchi ............ F24D 19/1054 165/63 |

FOREIGN PATENT DOCUMENTS

| JP | 2017058071 A | * | 3/2017 | .............. F25B 39/02 |
| KR | 10-0725588 B1 | | 6/2007 | |
| KR | 10-1973485 B1 | | 4/2019 | |

OTHER PUBLICATIONS

Pdf is translation of foreign reference JP-2017058071-A (Year: 2017).*

* cited by examiner

*Primary Examiner* — Len Tran
*Assistant Examiner* — Kamran Tavakoldavani
(74) *Attorney, Agent, or Firm* — Paratus Law Group, PLLC

(57) ABSTRACT

A controlled-type recalcitrant high-concentration freeze-separation apparatus, includes: a condenser having therein a condenser stainless antifreeze tube formed in a cell and tube form, and a condenser copper refrigerant tube formed in a cell and tube form inside the stainless antifreeze tube to block direct contact between circulating water flowing into the condenser and the condenser copper refrigerant tube; and an evaporator having therein an evaporator stainless antifreeze tube formed in a form of a cell and tube inside, and an evaporator copper refrigerant tube formed in a cell and tube form inside the evaporator stainless antifreeze tube to block direct contact between circulating water flowing into the evaporator and the evaporator copper refrigerant tube.

1 Claim, 14 Drawing Sheets

(58) Field of Classification Search
CPC ........ F25B 2341/0014; F25B 2341/001; F25B 2341/0013; F25B 2341/0015; F25B 2700/1931; F25B 2700/21152; F25B 40/02; F25B 47/006
See application file for complete search history.

CONTROLLED-TYPE, NON-DECOMPOSABLE, HIGH-CONCENTRATION PROCESS WATER FREEZE-SEPARATION APPARATUS

CROSS-REFERENCE TO RELATED APPLICATION

This application claims priority to Korean Patent Application No. 10-2021-0021770 (filed on Feb. 17, 2021), which is hereby incorporated by reference in its entirety.

BACKGROUND

The present disclosure relates to a controlled-type, non-decomposable, high-concentration process water freeze-separation apparatus, and in particular, a controlled-type non-decomposable high-concentration process water freeze-separation apparatus which blocks corrosion of copper refrigerant tubes from process water to extend life and enhance stability, easily controls supercooling, fine ice seed water generation, and ice slurry formation by controlling the retention time of inflow water and concentrated water, and reduces power consumption by refrigerant circulation flow.

In general, a process water freeze-separation apparatus is a device that freezes process water containing hazardous substances and separates process water from the hazardous substances to be recovered.

As an example of such a process water freeze-separation apparatus, Korean Patent No. 10-0725588 discloses a method for treating acetic acid wastewater containing acetic acid generated in large quantities in a manufacturing process of chemicals such as acetic acid, terephthalic acid, isophthalic acid, cellulose acetate and the like in which the wastewater is supersaturated in a temperature range at which thermal equilibrium of the wastewater is maintained and cooled at a constant cooling rate to form ice crystals and concentrated acetic acid, the ice crystals and concentrated acetic acid are separated from the residual liquid, and the separated ice crystals are heated and melted at a constant heating rate to separate and recover water and concentrated acetic acid.

Korea Patent No. 10-1973485 discloses a concentrated water treatment system includes a first cooling treatment unit which cools first concentrated water introduced therein to discharge second concentrated water and ice, a first separation processing unit connected to the first cooling treatment unit and configured to separate the second concentrated water and the ice introduced therein, a concentrated water storage unit connected to the first separation processing unit and configured to discharge synthetic concentrated water when salt concentration of the synthetic concentrated water including the second concentrated water reaches a set value, a second cooling treatment unit connected to the concentrated water storage unit and configured to cool the synthetic concentrated water introduced therein to discharge a third concentrated water, ice and salt, and a second separation treatment unit connected to the second cooling treatment unit and configured to separate the third concentrated water, ice and salt introduced therein, wherein the third concentrated water generated in the second separation treatment unit is recycled to the concentrated water storage unit.

However, according to the conventional technologies, a refrigerant tube in a condenser and an evaporator is easily corroded by contact with process water containing contaminants, and it is difficult to easily control supercooling, generation of fine ice seed, and formation of ice slurry.

PRIOR ART DOCUMENT (Patent Document)
Korean Patent No. 10-0725588
Korean Patent No. 10-1973485

SUMMARY

In view of the above, the present disclosure provides a controlled-type non-decomposable high-concentration process water freeze-separation apparatus which blocks corrosion of copper refrigerant tubes from process water to extend life and enhance stability, easily controls supercooling, fine ice seed water generation, and ice slurry formation by controlling the retention time of inflow water and concentrated water, and reduces power consumption by refrigerant circulation flow.

The controlled-type non-decomposable high-concentration process water freeze-separation apparatus includes a condenser (1-1) having therein a condenser stainless antifreeze tube (1-2) formed in a cell and tube form, and a condenser copper refrigerant tube (1-3) formed in a cell and tube form inside the stainless antifreeze tube (1-2) to block direct contact between circulating water flowing into the condenser (1-1) and the condenser copper refrigerant tube (1-3); and an evaporator (2-1) having therein an evaporator stainless antifreeze tube (2-2) formed in a form of a cell and tube inside, and an evaporator copper refrigerant tube (2-3) formed in a cell and tube form inside the evaporator stainless antifreeze tube (2-2) to block direct contact between circulating water flowing into the evaporator (2-1) and the evaporator copper refrigerant tube (2-3), wherein an inflow water retention time is controlled by formation of circulating water between the evaporator (2-1) and a freeze separation tank (3-1) and circulating water between an ejector (7-1) and the freeze separation tank (3-1) and control of an outflow water amount from an inflow water tank (14-1), to thereby control supercooling, fine seed water generation, and ice slurry formation and melting, and wherein a concentrated water retention time is controlled by formation of circulating water between the evaporator (2-1) and a salt separation tank (5-1) and circulating water between the ejector (7-1) and the salt separation tank (5-1) and control of an outflow water amount from a concentrated water tank (15-1), to thereby control supercooling, fine seed water generation, and ice slurry formation and melting.

According to one embodiment of the present disclosure, the condenser stainless antifreeze tube and the evaporator stainless antifreeze tube in a cell and tube form are respectively formed inside the condenser and the evaporator, and in the same way, the condenser copper refrigerant tube and the evaporator copper refrigerant tube in a cell and tube form are respectively formed inside the condenser stainless antifreeze tube and the evaporator stainless antifreeze tube, to thereby block the direct contact between the process water and the copper refrigerant tube, so that corrosion of the copper refrigerant tube can be prevented and the lifespan of the copper refrigerant tube can be extended.

In addition, an inflow water retention time can be controlled by formation of circulating water between the evaporator and the freeze separation tank and circulating water between the ejector and the freeze separation tank and control of an outflow water amount from the inflow water tank, to thereby control supercooling, fine seed water generation, and ice slurry formation and melting. Further, a concentrated water retention time can be controlled by formation of circulating water between the evaporator and the salt separation tank and circulating water between the ejector and the salt separation tank and control of an outflow water amount from the concentrated water tank, to thereby control supercooling, fine seed water generation, and ice slurry formation and melting.

In addition, power consumption can be reduced by forming a refrigerant circulation flow between the condenser and the refrigerant ejector, between the gas-liquid separator and the refrigerant compressor, between the gas-liquid separator and the freezing separation tank, and between the evaporator and the refrigerant ejector. In particular, by forming a refrigerant circulation flow between the refrigerant ejector and the refrigerant compressor, it is possible to maintain the pressure when the low-pressure refrigerant gas transferred after heat exchange with the condenser flows into the refrigerant compressor, thereby reducing power consumption of the refrigerant compressor.

Further, since the present disclosure freezes and separates acid or alkaline wastewater and volatile wastewater, there is no generation of harmful gases and salts generated during neutralization of acid or alkaline substances, so that it is possible to safely process volatile substances not to leak as the treated water.

DETAILED DESCRIPTION

Figure 1:
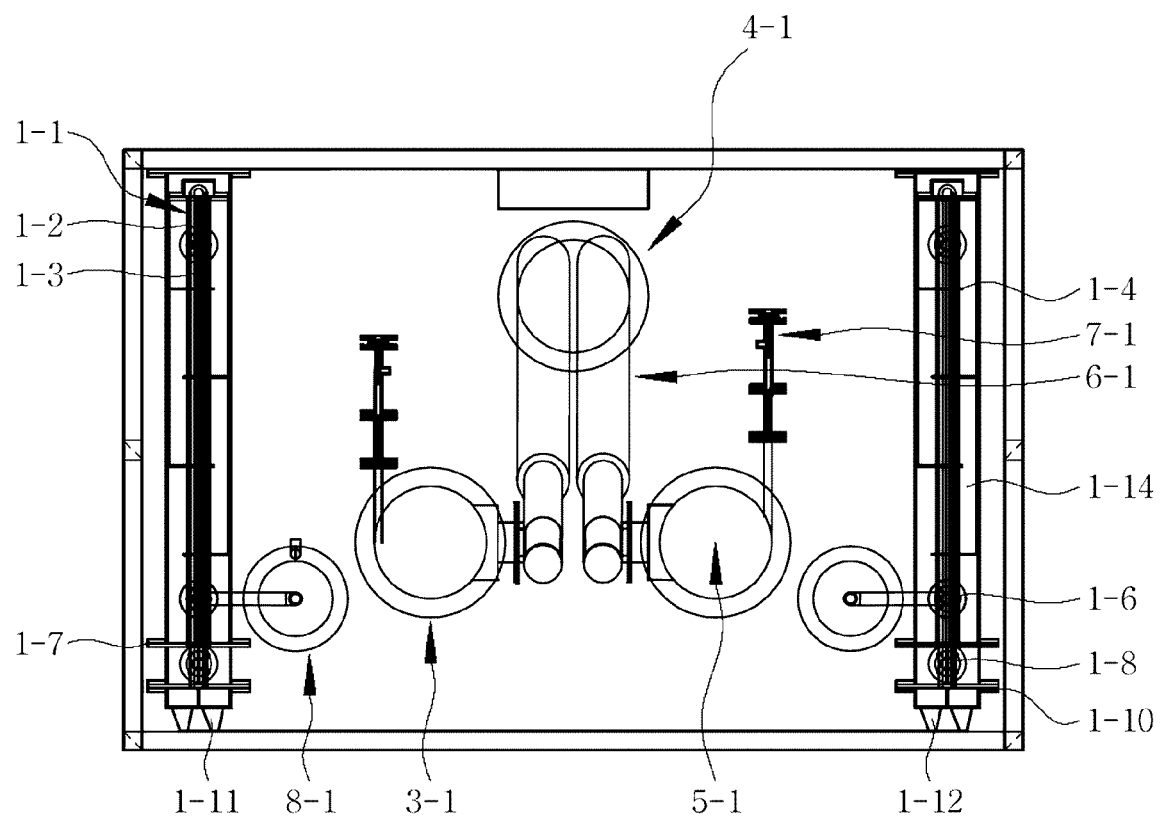
FIG. 1 is a plan view of a controlled-type non-decomposable high-concentration process water freeze-separation apparatus according to one embodiment of the present disclosure.

Hereinafter, a controlled-type non-decomposable high-concentration freeze-separation apparatus according to embodiments of the present disclosure will be described in detail with reference to the accompanying drawings. The present disclosure may have various changes and various forms, and specific embodiments are illustrated in the drawings and described in detail in the specification. However, this is not intended to limit the present disclosure to the specific embodiments, and it should be understood to include all modifications, equivalents and substitutes included in the spirit and scope of the present disclosure. In describing each figure, like reference numerals are given to like components. In the accompanying drawings, the dimensions of the structures are enlarged for clarity of the present disclosure, or reduced for understanding of the schematic configuration.

Also, terms such as first and second may be used to describe various elements, but the elements should not be limited by the terms. The above terms are used only for the purpose of distinguishing one component from another. For example, without departing from the scope of the present disclosure, a first component may be referred to as a second component, and similarly, a second component may also be referred to as a first component. Meanwhile, unless otherwise defined, all terms used herein, including technical or scientific terms, have the same meaning as commonly understood by those of ordinary skill in the art to which the present disclosure belongs. Terms such as commonly used dictionary definitions should be interpreted as having meanings consistent with the meanings in the context of the related art, and unless explicitly defined in the present specification, they are not to be interpreted in an ideal or excessively formal meaning.

Example

Figure 2:
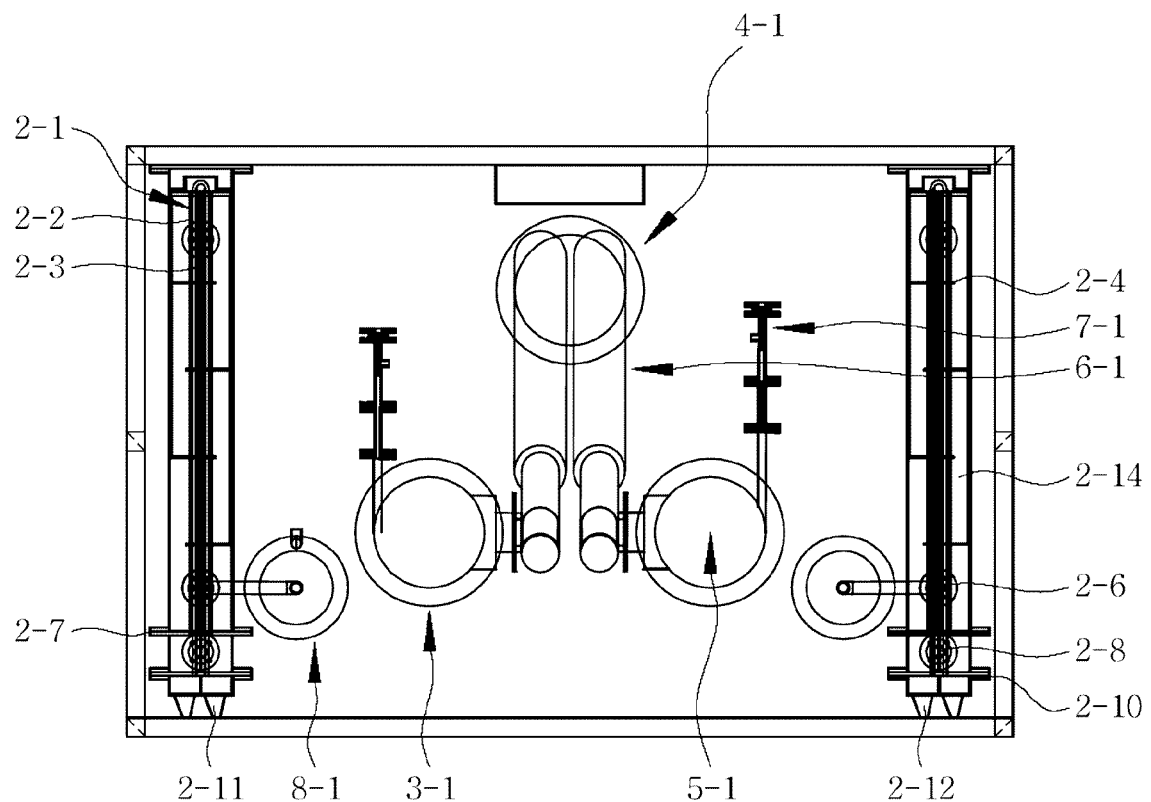
FIG. 2 is a bottom view of the controlled-type non-decomposable high-concentration process water freeze-separation apparatus according to one embodiment of the present disclosure.
Figure 3:
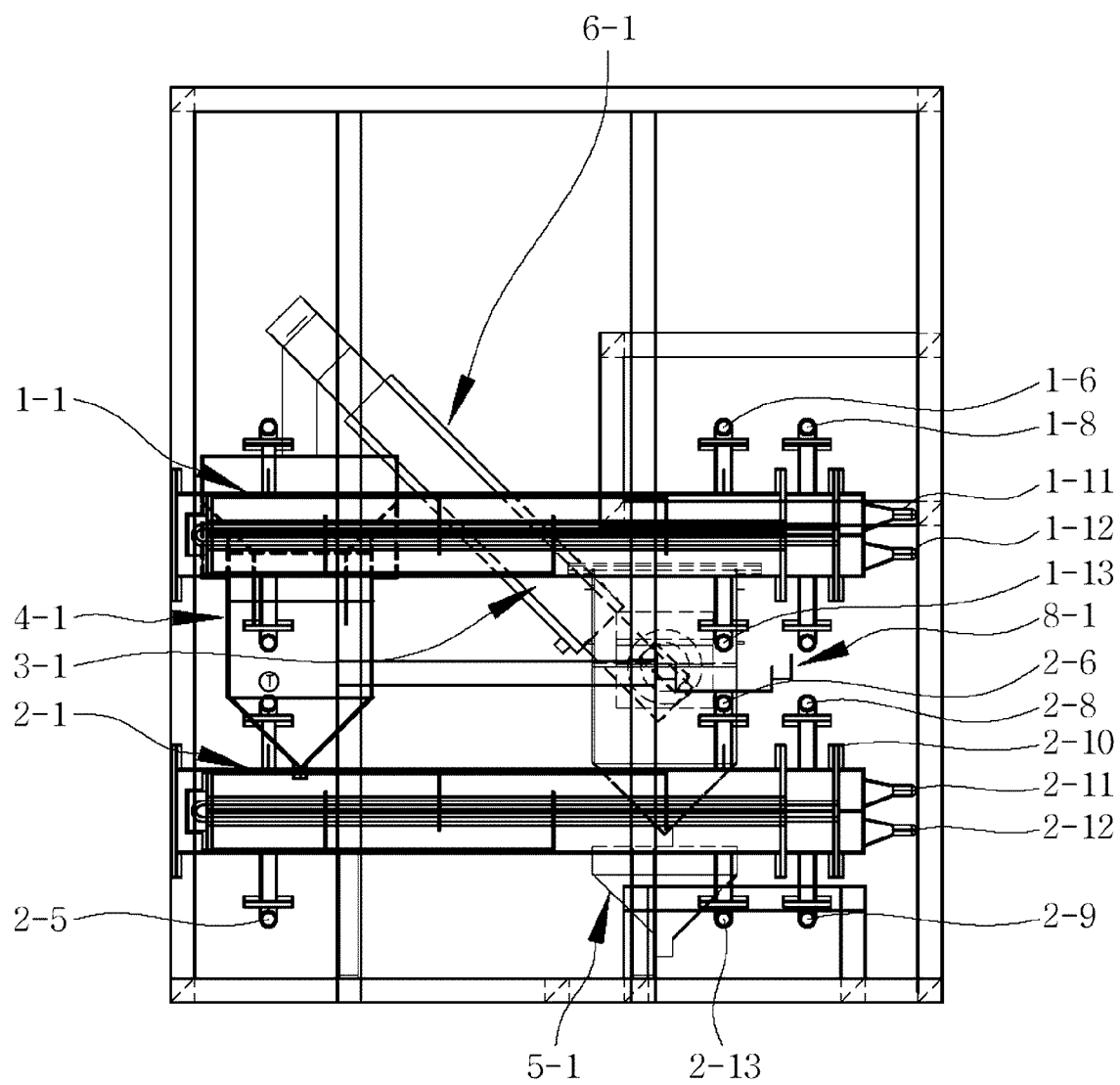
FIG. 3 is a side view of the controlled-type non-decomposable high-concentration process water freeze-separation apparatus according to one embodiment of the present disclosure.
Figure 4:
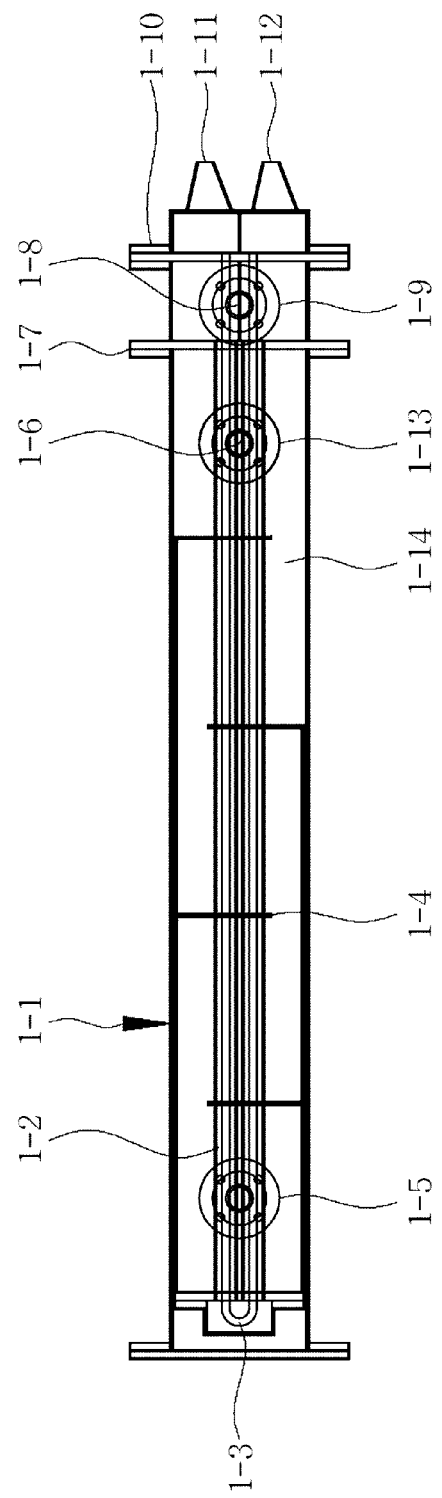
FIG. 4 is a cross-sectional view of a condenser in the controlled-type non-decomposable high-concentration process water freeze-separation apparatus according to one embodiment of the present disclosure.
Figure 5:
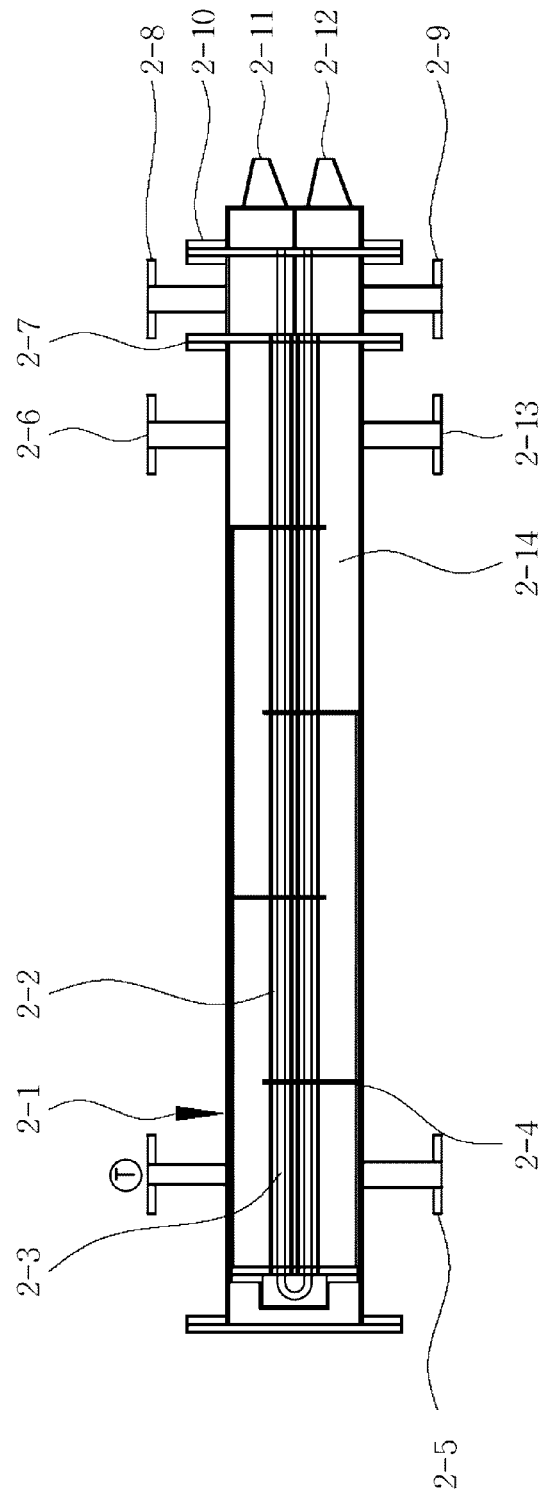
FIG. 5 is a cross-sectional view of an evaporator in the controlled-type non-decomposable high-concentration process water freeze-separation apparatus according to one embodiment of the present disclosure.
Figure 6:
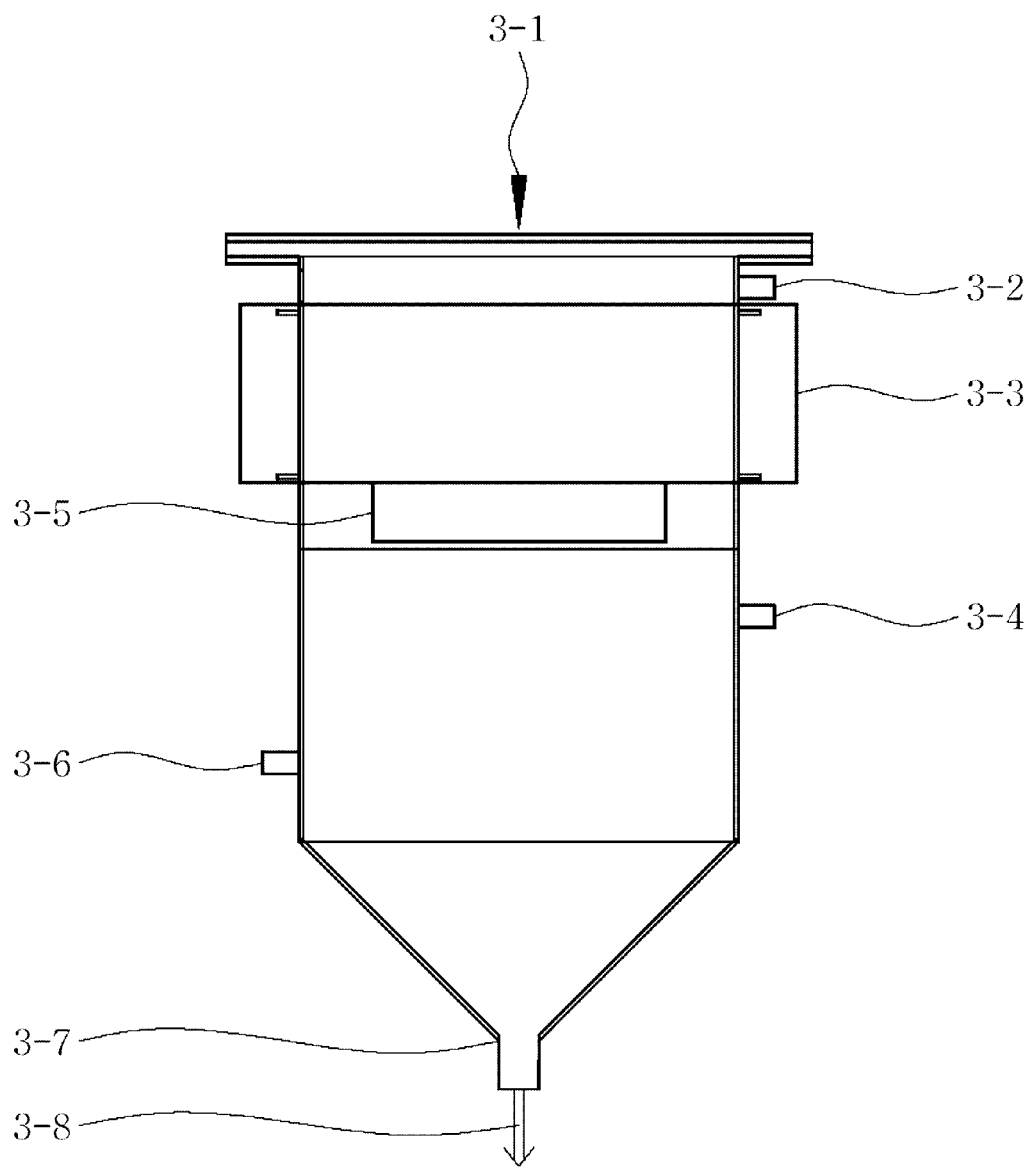
FIG. 6 is a cross-sectional view of a freeze separation tank in the controlled-type non-decomposable high-concentration process water freeze-separation apparatus according to one embodiment of the present disclosure.
Figure 7:
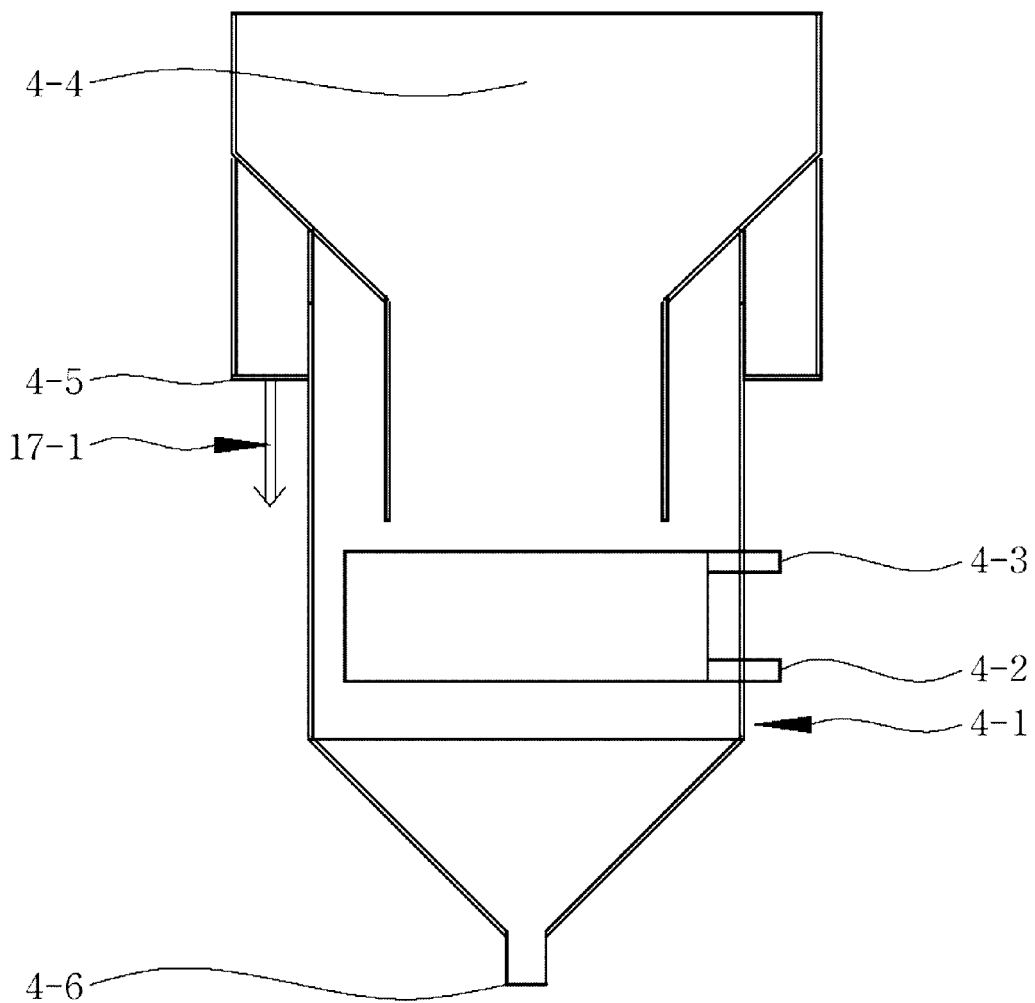
FIG. 7 is a cross-sectional view of a melting tank in the controlled-type non-decomposable high-concentration process water freeze-separation apparatus according to one embodiment of the present disclosure.
Figure 8:
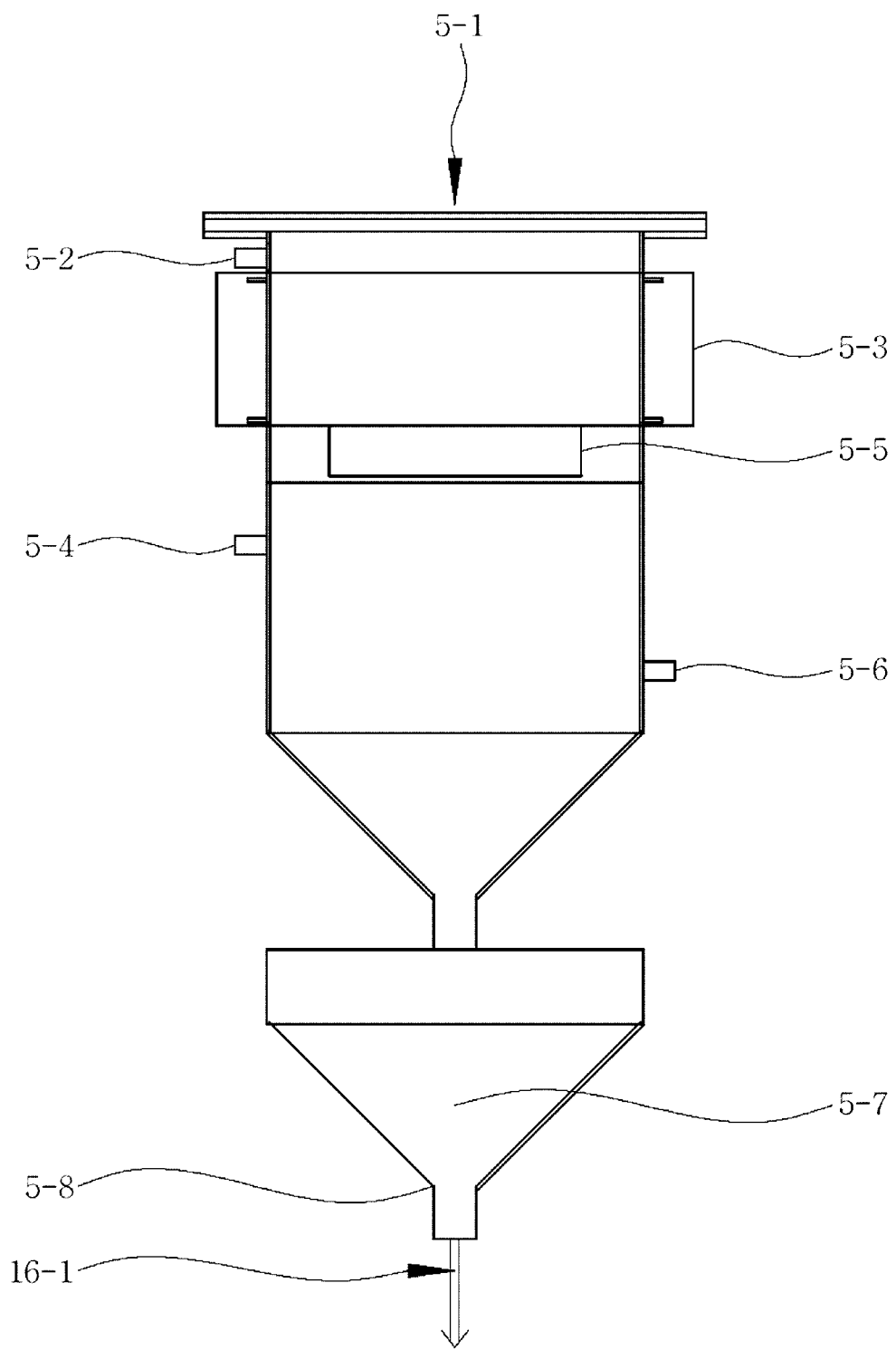
FIG. 8 is a cross-sectional view of a salt separation tank in the controlled-type non-decomposable high-concentration process water freeze-separation apparatus according to one embodiment of the present disclosure.
Figure 9:
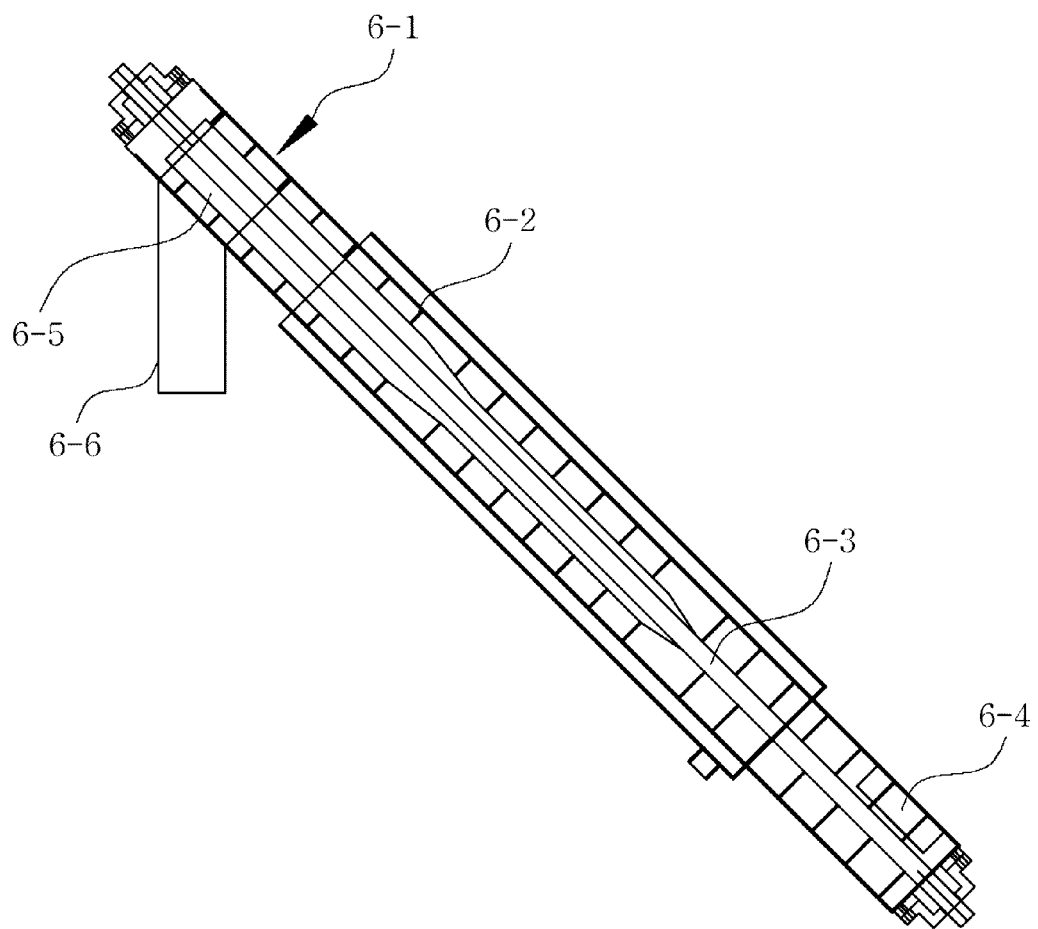
FIG. 9 is a cross-sectional view of an ice compression transporter in the controlled-type non-decomposable high-concentration process water freeze-separation apparatus according to one embodiment of the present disclosure.
Figure 10:
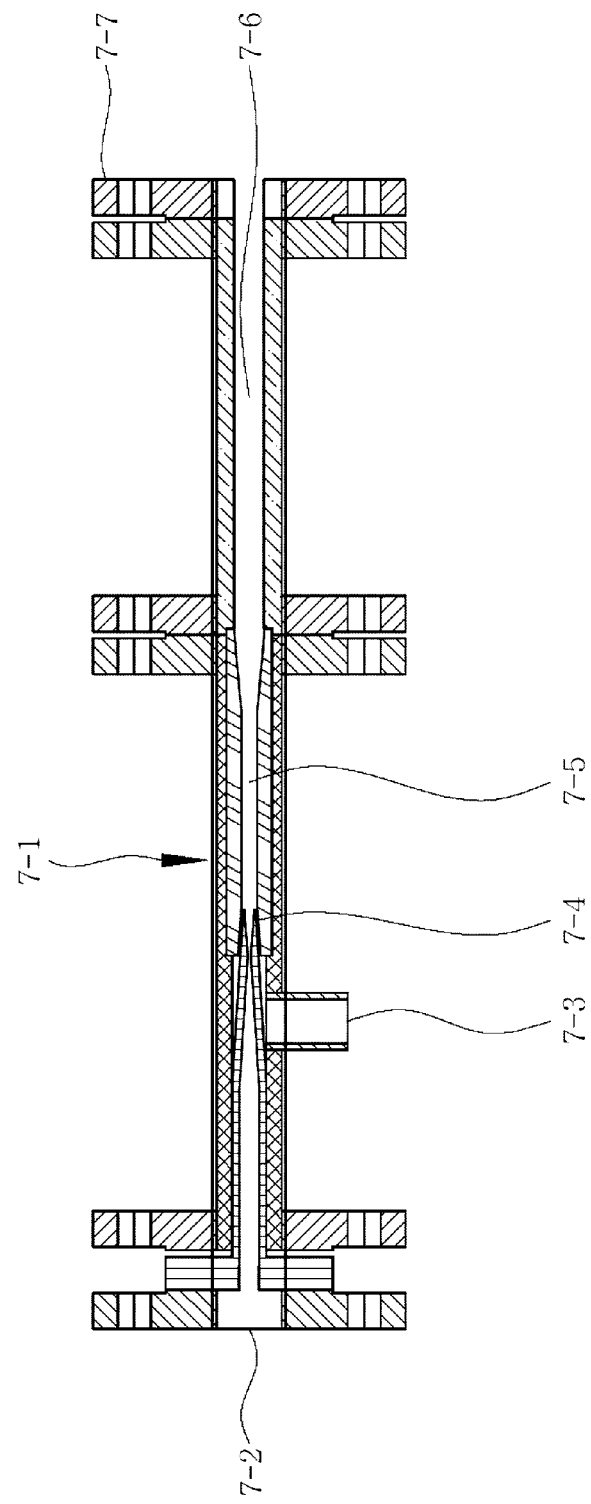
FIG. 10 is a cross-sectional view of an ejector in the controlled-type non-decomposable high-concentration process water freeze-separation apparatus according to one embodiment of the present disclosure.
Figure 11:
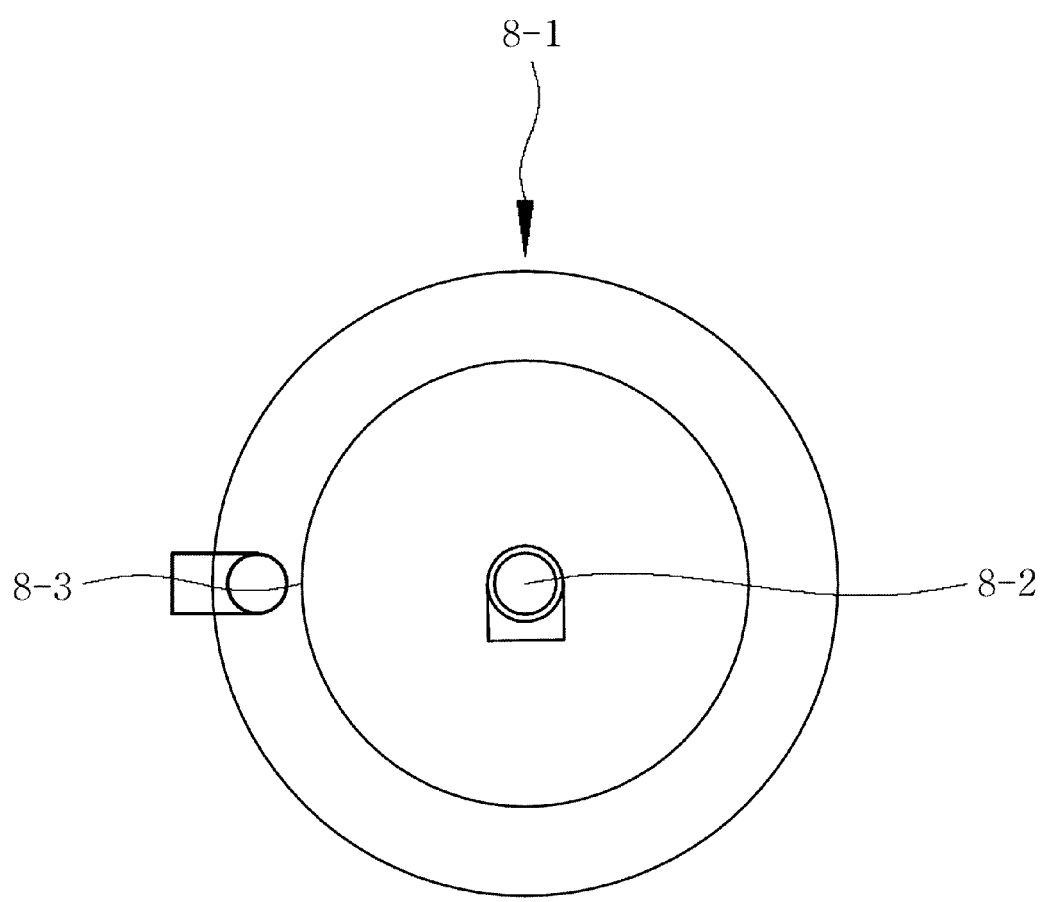
FIG. 11 is a cross-sectional view of a water level control tank in the controlled-type non-decomposable high-concentration process water freeze-separation apparatus according to one embodiment of the present disclosure.
Figure 12:
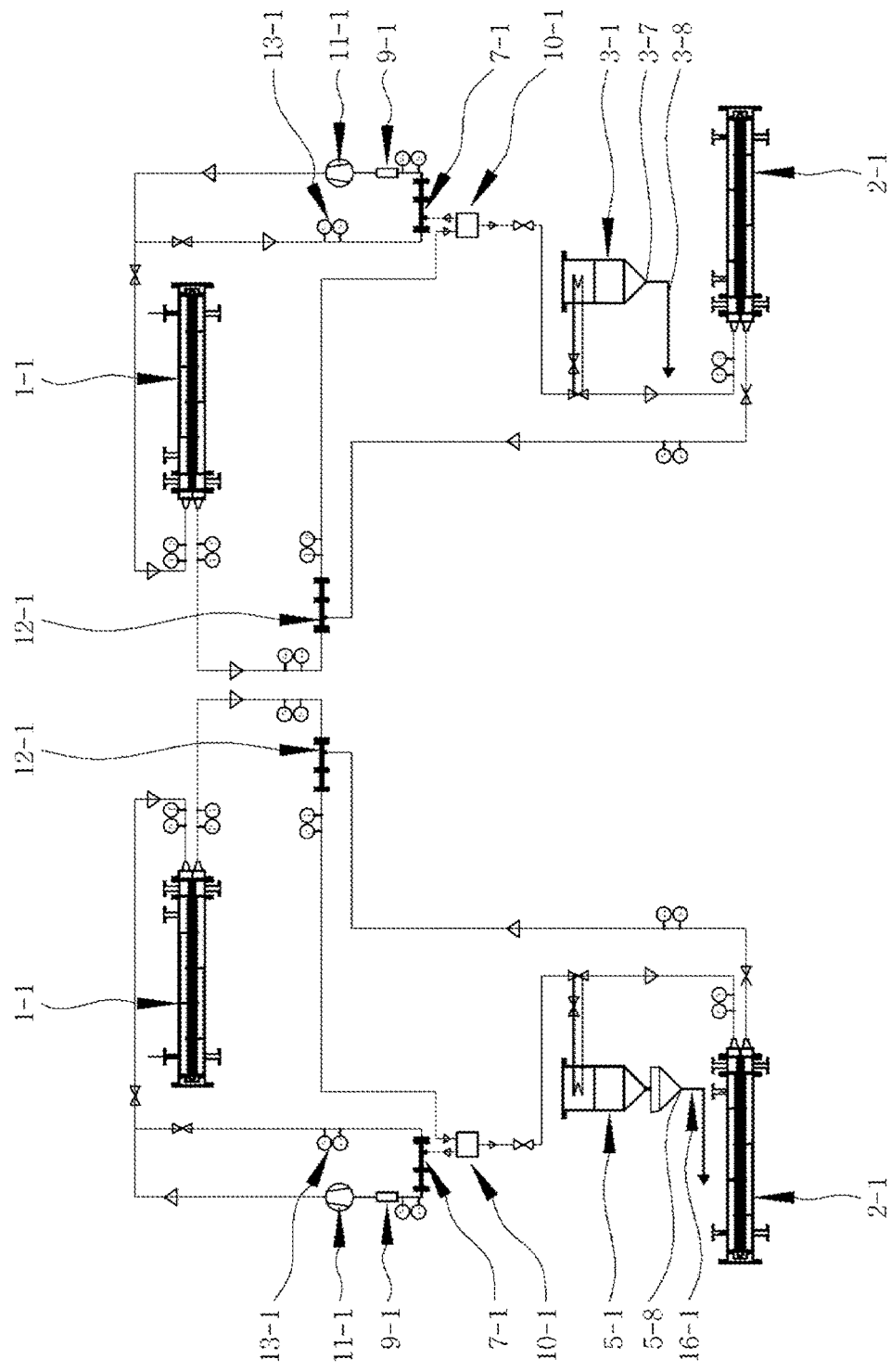
FIG. 12 is a refrigerant flow diagram of the controlled-type difficult-to-decompose high-concentration process water freeze-separation apparatus according to one embodiment of the present disclosure.
Figure 13:
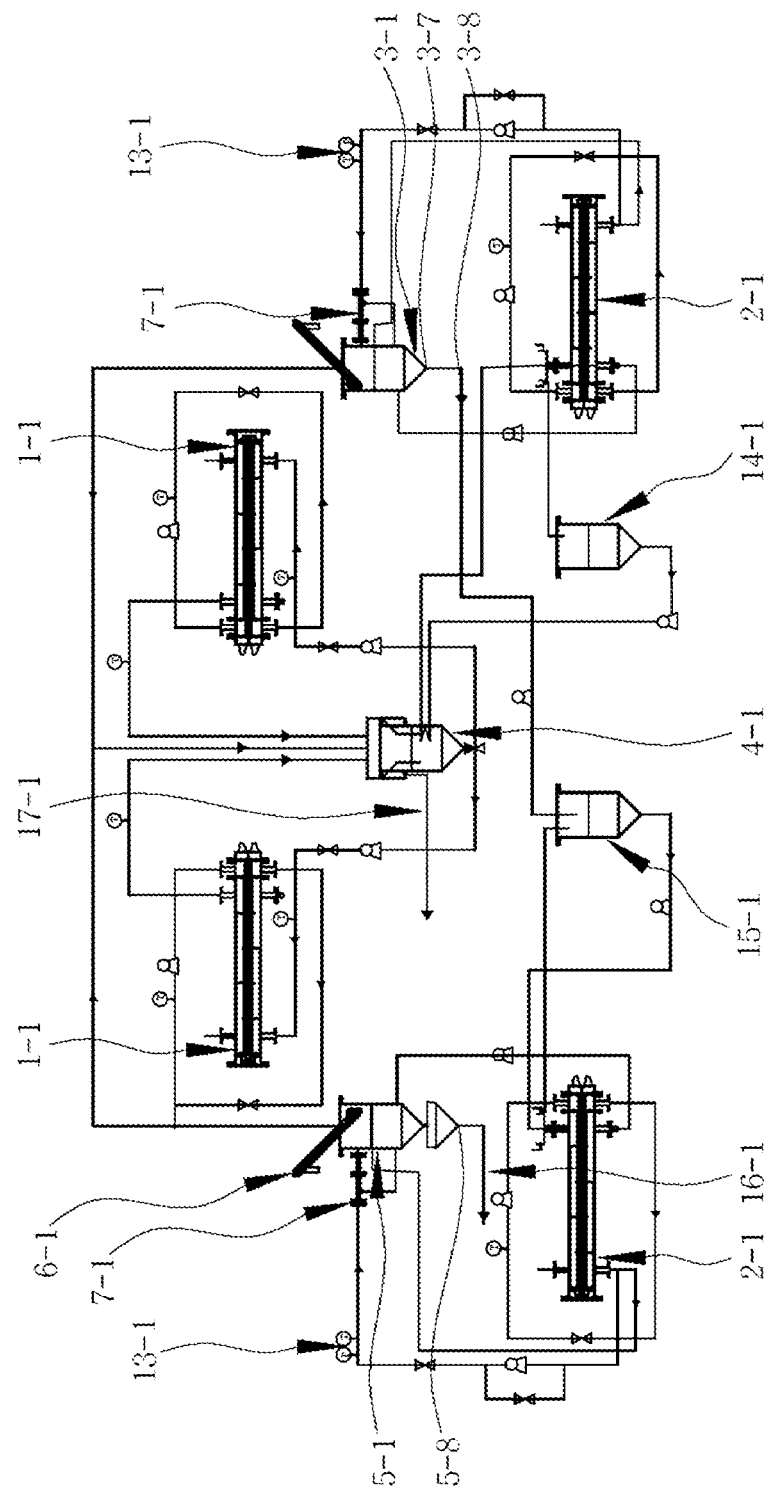
FIG. 13 is a water flow diagram of the controlled-type non-decomposable high-concentration process water freeze-separation apparatus according to one embodiment of the present disclosure.
Figure 14:
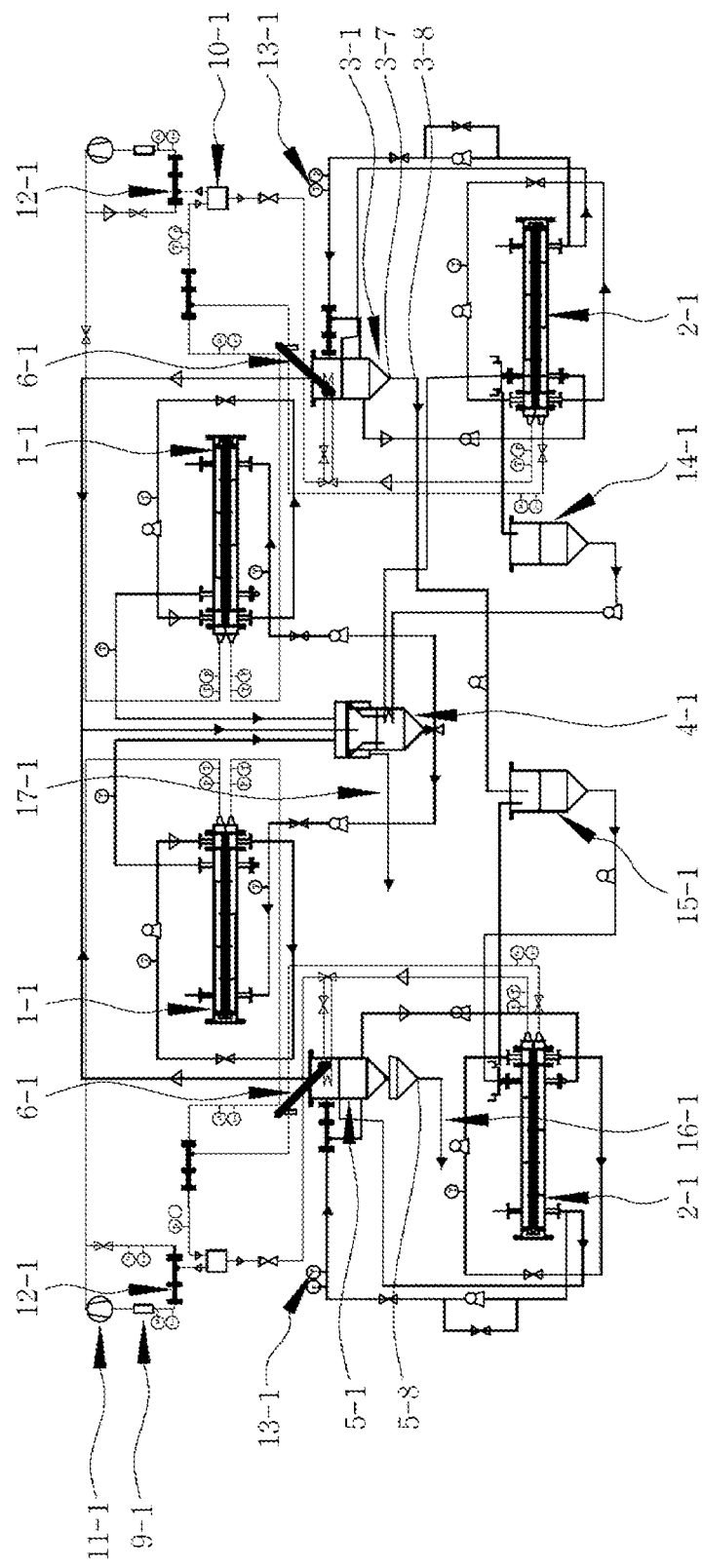
FIG. 14 is a flow chart of refrigerant and water of the controlled-type non-decomposable high-concentration process water freeze-separation apparatus according to one embodiment of the present disclosure.

FIG. 1 is a plan view of a controlled-type recalcitrant high-concentration process water freeze-separation apparatus according to one embodiment of the present disclosure, FIG. 2 is a bottom view of the controlled-type difficult-to-decompose high-concentration process water freeze-separation apparatus according to one embodiment of the present disclosure, and FIG. 3 is a side view of the controlled-type recalcitrant high-concentration process water freeze-separation apparatus according to one embodiment of the present disclosure.

As shown, the controlled-type non-decomposable high-concentration freeze-separation apparatus according to one embodiment of the present disclosure includes, as components, a condenser 1-1, an evaporator 2-1, a freeze separation tank 3-1, a melting tank 4-1, a salt separation tank 5-1, an ice compression transporter 6-1, an ejector 7-1, a water level control tank 8-1, a gas-liquid separator 10-1, a refrigerant compressor 11-1, a refrigerant ejector 12-1, an inflow water tank 14-1, and a concentrated water tank 15-1. The controlled-type non-decomposable high-concentration process water freeze-separation apparatus blocks corrosion of copper refrigerant tubes from process water in the condenser 1-1 and the evaporator 2-1 to extend life and enhance stability, and easily controls supercooling, generation of fine ice seed water, and formation and melting of ice slurry by controlling the retention time of inflow water and concentrated water.

Hereinafter, a controlled-type recalcitrant high-concentration freeze-separation apparatus according to one embodiment of the present disclosure will be described in detail focusing on each of the above components.

The condenser 1-1 has therein a stainless antifreeze tube 1-2 formed in a cell and tube form. A copper refrigerant tube 1-3 is formed in a cell and tube form inside the stainless antifreeze tube 1-2 to prevent corrosion caused by direct contact between circulating water 1-14 and the condenser copper refrigerant tube 1-3. The condenser 1-1 and the melting tank 4-1 are connected to form a flow of the circulating water 1-14. Accordingly, high-pressure refrigerant gas generated in a refrigerant compressor 11-1 is converted into high-pressure refrigerant liquid, and the temperature of the circulating water 1-14 increases. The circulating water 1-14 with the increased temperature is introduced into a melting tank ice inlet portion 4-4 and has a circulating flow used as ice melt water in the melting tank 4-1.

In the condenser 1-1, the stainless antifreeze tube 1-2 is provided in the form of a cell and tube inside the condenser 1-1 to make heat exchange while preventing corrosion due to direct contact between the refrigerant and the circulating water 1-14 and occurs.

In the condenser 1-1, the condenser copper refrigerant tube 1-3 is provided in the form of a cell and tube with an indirect contact structure inside the condenser stainless antifreeze tube 1-2, so that the circulating water 1-14 can make heat exchange with the antifreeze and the refrigerant without direct contact therebetween.

In the condenser 1-1, a circulating water baffle 1-4 is formed in a semi-moon shape at upper and lower portions on an outer peripheral surface of the condenser stainless antifreeze tube 1-2 to prevent channeling by allowing the circulating water 1-14 to flow up and down instead of a straight flow.

In the condenser 1-1, a circulating water inlet 1-5 is formed at a lower portion of an outer peripheral surface of the condenser 1-1 to allow the circulating water 1-14 to flow therein. Meanwhile, a circulating water outlet 1-6 is formed at an upper portion of the outer peripheral surface of the condenser 1-1 to allow the circulating water 1-14 to flow out.

In the condenser 1-1, a circulating water-antifreeze separation flange 1-7 is formed between the circulating water outlet 1-6 and a condenser antifreeze inlet 1-8, and it serves to separate the circulating water 1-14 and the antifreeze so that they do not mix.

In the condenser 1-1, the condenser antifreeze inlet 1-8 is an inlet of the condenser stainless antifreeze tube 1-2 and is formed on the right side of the circulating water-antifreeze separation flange 1-7 to allow the antifreeze to be introduced therein to prevent the circulating water 1-14 from being cooled to be unnecessarily adhered. In the condenser 1-1, a condenser antifreeze outlet 1-9 is located between the circulating water 1-14 and the condenser copper refrigerant tube 1-3 on the lower side of the outer peripheral surface of the condenser 1-1. The antifreeze is discharged through the condenser antifreeze outlet 1-9 after preventing the circulating water (1-14) from being cooled.

In the condenser 1-1, a condenser antifreeze-refrigerant separation flange 1-10 is formed between the condenser antifreeze inlet 1-8 and a condenser refrigerant inlet 1-11 inside the condenser 1-1 to prevent the antifreeze and refrigerant from mixing.

In the condenser 1-1, the condenser refrigerant inlet 1-11 is connected to the condenser copper refrigerant tube 1-3, and allows a high-pressure gas refrigerant to be introduced from a refrigerant compressor 11-1. A condenser refrigerant outlet 1-12 is connected to the condenser copper refrigerant tube 1-3, so that a high-pressure gas refrigerant flows in from the refrigerant compressor 11-1, and then is condensed into a high-pressure liquid refrigerant and discharged through the condenser refrigerant outlet 1-12.

In the condenser 1-1, a condenser sensor installation hole 1-13 is located on the outer peripheral surface of the condenser 1-1, and is provided to measure the temperature of the circulating water 1-14.

The evaporator 2-1 is connected to a lower portion of the condenser 1-1 so that the evaporator inflow-circulating water flow is formed. A low-pressure refrigerant liquid introduced into the evaporator 2-1 is converted into low-pressure refrigerant gas, and the temperature of the evaporator inflow-circulating water 2-14 is lowered. The inflow-circulating water of the lowered temperature is supercooled by cooling heat exchange.

In the evaporator 2-1, an evaporator stainless antifreeze tube 2-2 is provided in the form of a cell and tube inside the evaporator 2-1 to make heat exchange between the refrigerant and the circulating water.

In the evaporator 2-1, an evaporator copper refrigerant tube (2-3) is provided in the form of a cell and tube with an indirect contact structure inside the condenser stainless antifreeze tube 2-3, so that the evaporator inflow circulating water 2-14 can make heat exchange with the antifreeze and the refrigerant without direct contact therebetween.

In the evaporator 2-1, an evaporator inflow-circulating water baffle 2-4 is formed in a semi-moon shape at upper and lower portions on an outer peripheral surface of the stainless tube inside the evaporator 2-1, and the evaporator inflow-circulating water 2-14 flow up and down to prevent channeling.

In the evaporator 2-1, an evaporator inflow-circulating water outlet 2-5 is provided at a lower portion of the outer peripheral surface of the evaporator 2-1, which allows formation of refrigerant circulation flow between the evaporator 2-1 and the freeze separation tank 3-1 to reduce cooling energy consumption. Through the inflow-circulating water outlet 2-5, the evaporator inflow water and the circulating water of the freeze separation tank (or salt separation tank) that assist in the formation of the ice slurry are discharged.

In the evaporator 2-1, an evaporator inlet water inlet 2-6 is provided at an upper portion of the outer peripheral surface of the evaporator 2-1, and the inflow water pre-cooled through a stainless coil type heat-exchange tube in introduced onto the inner peripheral surface of the melting tank 4-1 from the outlet of the water level control tank 8-1.

In the evaporator 2-1, an evaporator inflow-circulating water antifreeze separation flange 2-7 is formed across the inside and outside of the evaporator 2-1 to separate the evaporator inflow-circulating water 2-14 and antifreeze not to be mixed when antifreeze flows in.

In the evaporator 2-1, an evaporator antifreeze inlet 2-8 is located at an upper position on one side of the outer peripheral surface of the evaporator 2-1, and an evaporator antifreeze outlet 2-9 is located at a lower position of the outer peripheral surface of the evaporator 2-1.

In the evaporator 2-1, an evaporator antifreeze-refrigerant separation flange 2-10 is provided between the evaporator antifreeze inlet 2-8 located on the outer peripheral surface of the evaporator 2-1 and an evaporator refrigerant inlets 2-11 located at one end of the outer peripheral surface of the evaporator 2-1 so that the antifreeze and the refrigerant do not mix.

In the evaporator 2-1, the evaporator refrigerant inlet 2-11 is located at one end of the cylindrical evaporator 2-1, and energy consumption efficiency is increased by circulating a low-pressure liquid refrigerant separated in a gas-liquid separator 10 into the evaporator 2-1 through a coil-type heat exchange tube of the freeze separation tank.

In the evaporator 2-1, an evaporator refrigerant outlet 2-12 is positioned below the evaporator refrigerant inlet 2-11 at one end of the cylindrical evaporator 2-1, and is provided to allow the refrigerant introduced into the evaporator to be discharged after circulation in the evaporator.

In the evaporator 2-1, an evaporator circulation water inlet 2-13 is located at a lower position on one side of the outer peripheral surface of the evaporator 2-1, and the circulating flow between the freeze separation tank 3-1 and the evaporator 2-1 promotes the formation of ice slurry in the freeze separation tank 3-1 and improves energy consumption efficiency by maintaining low-temperature water in the evaporator. The evaporator circulating water flows out from the lower circulating water outlet 3-6 of the freezing separation tank 3-1 and flows into the evaporator circulating water inlet 2-13.

In the evaporator 2-1, the evaporator inflow-circulating water 2-14 is the evaporator inflow water and the freezing separation tank circulating water or the evaporator inflow water and the salt separation tank circulating water.

The freeze separation tank 3-1 is connected to an outer side of the evaporator 2-1 through a pipe, and the inflow-circulating water 2-14 of the evaporator whose temperature is lowered generates fine ice seed water in the ejector 7-1 and flows into the freezing separation tank inflow water inlet 3-2. In the freeze separation tank 3-1, the high-pressure liquid refrigerant circulated from the condenser 1-1 to the evaporator 2-1 is converted to a low-pressure liquid refrigerant through the refrigerant ejector 12-1 and the gas-liquid separator 10-1 and flows in and out through the freezing separation tank circulating water inlet 3-4 and the freezing separation tank circulating water outlet 3-6 formed at a lower outer peripheral surface of a copper refrigerant tube coil type installation part 3-3 to form supercooling by the circulating water. Such a circulation flow can promote ice slurry growth while reducing cooling energy consumption.

In the freeze separation tank 3-1, the freeze separation tank inflow water inlet 3-2 is located on an outer side surface of the evaporator 2-1, and the evaporator outflow water is introduced therein through the ejector 7-1.

In the freeze separation tank 3-1, the freeze separation tank copper refrigerant tube coil-type installation part 3-3 is located on the outer peripheral surface of the freeze separation tank 3-1 and below the freeze separation tank inflow water inlet 3-2, and a copper refrigerant tube for heat exchange is formed in a coil type so that cooling heat exchange for forming an ice slurry is performed.

In the freeze separation tank 3-1, the freeze separation tank circulating water inlet 3-4 is located below the freeze separation tank copper refrigerant tube coil type installation part 3-3, and a part of the outflow water from the evaporator 2-1 flows into the freeze separation tank 3-1 through the freeze separation tank circulating water inlet 3-4 as the freezing separation tank circulating water, and the circulating water promotes the formation of ice slurry in the freezing separation tank 3-1.

In the freeze separation tank 3-1, a freeze separation tank ice slurry outlet 3-5 is located below the freeze separation tank copper refrigerant tube coil-type installation part 3-3, and the ice slurry formed in the freeze separation tank 3-1 is transferred to the melting tank through the freeze separation tank ice slurry outlet 3-5.

In the freeze separation tank 3-1, a freeze separation tank circulating water outlet 3-6 is located opposite to and below the freeze separation tank circulating water inlet 3-4, and formed for circulation flow with the evaporator 2-1 to promote the formation of ice slurry in the freeze separation tank 3-1.

In the freeze separation tank 3-1, a concentrated water outlet 3-7 is located in a lower center of the freeze separation tank 3-1, and formed to transfer the concentrated water that forms no ice slurry to a concentrated water tank 15-1.

In the freeze separation tank 3-1, concentrated water 3-8 flows out from the concentrated water outlet 3-7 located in the lower center of the freeze separation tank 3-1 and is transferred to the concentrated water tank 15-1.

The melting tank 4-1 is connected to an ice slurry outlet 3-5 of the freeze separation tank 3-1, an ice slurry outlet 5-5 of the salt separation tank 5-1, and an ice compression transfer inlet 6-4 of the ice compression transfer machine 6-1, and along an inner peripheral surface thereof, a heat exchange inflow water inlet tube 4-2 and a heat exchange inflow water outlet tube 4-3 are formed. Accordingly, the inflow water from the inflow water tank 14-1 flows into the heat exchange inflow water inlet tube 4-2, and then is pre-cooled (temperature-lowered) by the circulating water in the melting tank 4-1 to flow out to the evaporator 2-1. Then, the ice slurry grown in the freeze separation tank 3-1 and the salt separation tank 5-1 is transferred by the ice compression transporter 6-1 to be melted and flow out through the melting tank treated water outlet 4-5.

In the melting tank 4-1, the heat exchange inflow water inlet tube 4-2 of the melting tank 4-1 is located at a lower portion on an inner peripheral surface of the melting tank 4-1, and the ice introduced into the melting tank 4-1 is melted in the heat exchange inflow water inlet tube 4-2.

In the melting tank 4-1, the heat exchange inflow water outlet tube 4-3 is located on the inner peripheral surface of the melting tank 4-1 above the heat exchange inflow water inlet tube 4-2, and allows the heat exchange inflow water to flow out.

In the melting tank 4-1, a melting tank ice inlet portion 4-4 is located at an upper portion the melting tank 4-1 and the ice slurry flowing out from the freezing separation tank ice slurry outlet 3-5 is transported and introduced by the compression transporter 6-1 through the melting tank ice inlet portion 4-4 into the melting tank 4-1.

In the melting tank 4-1, a melting tank treated water outlet 4-5 is located at an upper portion the melting tank 4-1, and the treated water melted from the ice in the melting tank ice inlet portion 4-4 flows out through the melting tank treated water outlet 4-5.

In the melting tank 4-1, a melting tank circulating water outlet 4-6 is located in a lower central portion of the melting tank 4-1 and is connected to the condenser 1-1.

The salt separation tank 5-1 is connected to each of the evaporator 2-1 and the ice compression transfer inlet 6-4, and controls a retention time of the concentrated water not treated in the freeze separation tank 3-1 to promote the formation of ice slurry. The salt that is not formed into the ice slurry in the salt separation tank 5-1 is discharged to the salt outlet 5-8. The ice slurry formed in the salt separation tank 5-1 is transferred to the ice compression transporter 6-1 through the ice slurry outlet 5-5, and then melted by the circulating water 1-14 flow out to the melting tank treated water outlet 4-5.

In the salt separation tank 5-1, the concentrated water inlet 5-2 of the salt separation tank is located at an upper end of the outer peripheral surface of the salt separation tank 5-1, and the concentrated water that is the outflow water from the evaporator 2-1 is supercooled by the circulation flow between the evaporator 2-1 and the salt separation tank 5-1 to flow into the fine ice seed water through the ejector 7-1.

In the salt separation tank 5-1, a salt separation tank copper refrigerant tube coil type installation part 5-3 is located below the salt separation tank concentrated water inlet 5-2, and the copper refrigerant tube for heat exchange is formed in a coil type and cooling heat exchange is performed to form an ice slurry.

In the salt separation tank 5-1, a salt separation tank circulating water inlet 5-4 is located below the copper refrigerant tube coil-type installation part 3-3 of the salt separation tank, and allows a portion of the effluent from the evaporator 2-1 to flow into the salt separation tank circulating water to promote the formation of ice slurry in the salt separation tank.

In the salt separation tank 5-1, the salt separation tank ice slurry outlet 5-5 is located below the copper refrigerant tube coil-type installation part 5-3 of the salt separation tank, and allows the ice slurry formed in the salt separation tank 5-1 to flow out and to be transferred to the melting tank 4-1.

In the salt separation tank 5-1, a salt separation tank circulating water outlet 5-6 is located opposite to and below the salt separation tank circulating water inlet 5-4, and is connected to the evaporator 2-1 to promote the formation of the ice slurry in the salt separation tank 5-1 and allows the circulation flow.

In the salt separation tank 5-1, a salt separation unit 5-7 is located at a lower portion of the salt separation tank 5-1, and the salt that is not formed into the ice slurry in the salt separation tank 5-1 is separated and accumulated.

In the salt separation tank 5-1, a salt outlet 5-8 is located at the bottom center of the salt separation tank 5-1, and the salt that is not formed into the ice slurry in the salt separation tank is accumulated in the salt separation unit 5-7 and then is discharged.

The ice compression transporter 6-1 is connected to the ice slurry outlet 3-5 of the freezing separation tank and the ice slurry outlet 5-5 of the salt separation tank, and includes an ice compression transfer screw 6-2, a screw shaft 6-3, an ice compression transport inlet 6-4, an ice compression transport compression part 6-5 and an ice compression transporter ice outlet 6-6. While compressing the ice slurry formed in the freeze separation tank 3-1 and the salt separation tank 5-1, the ice compression transporter 6-1 transfers the ice slurry as ice.

In the ice compression transporter 6-1, the ice compression transport screw 6-2 is located inside the ice compression transporter 6-1, and transports the ice slurry while compressing it as ice.

In the ice compression transporter 6-1, the ice compression screw shaft 6-3 is located at the center of the ice compression transport screw 6-2, and forms a central axis of the ice compression transport screw 6-2.

In the ice compression transporter 6-1, the ice compression transport inlet 6-4 is located at a lower portion of the ice compression transporter 6-1, and is connected to the freeze separation tank ice slurry outlet 3-5 and the salt separation tank ice slurry outlets 5-5 to allow the ice slurry to flow into the ice compression transporter.

In the ice compression transporter 6-1, the ice compression transporter 6-5 is located at an upper portion of the ice compression transporter 6-1. The ice compression transporter 6-5 transfers only the ice of the ice slurry to the melting tank 4-1 while transferring the ice slurry introduced from the located ice compaction transfer inlet 6-4 upward by the ice compaction transfer screw 6-2.

In the ice compression transporter 6-1, an ice outlet 6-6 is located at a lower portion of an upper end of the ice compression transporter 6-1, and compressed ice is discharged through the ice outlet 6-6 to fall into the melting tank 4-1.

The ejector 7-1 is connected to the freeze separation tank 3-1 and the salt separation tank 5-1, and includes an ejector inlet 7-2, an ejector circulation inlet 7-3, a nozzle 7-4, a mixing tube 7-5 and a diffuser 7-6. A circulating flow is formed by the ejector 7-1 in each of the freeze separation tank 3-1 and the salt separation tank 5-1 in which supercooling is formed to promote the generation of fine ice seed water.

In the ejector 7-1, the ejector inlet 7-2 is located at an upper end of one side of the ejector 7-1, and the inflow water of the freeze separation tank 3-1 and the concentrated water of the salt separation tank 5-1 are introduced separately in the ejector inlet 7-2.

In the ejector 7-1, the ejector circulation inlet 7-3 is located on a lower outer peripheral surface perpendicular to the ejector inlet 7-2, and the circulating water of the freeze separation tank 3-1 and the salt separation tank 5-1 is introduced in the ejector circulation inlet 7-3.

In the ejector 7-1, the nozzle 7-4 is located inside the ejector 7-1, and has a fine hole to eject the inflow water and the circulating water.

In the ejector 7-1, the mixing tube 7-5 is located inside the ejector 7-1, and the inflow water and circulating water ejected at high pressure by the nozzle 7-4 are mixed in the mixing tube 7-5.

In the ejector 7-1, the diffuser 7-6 decreases the pressure of the inflow water and the circulating water mixed in the mixing tube 7-5.

In the ejector 7-1, the ejector flange 7-7 is located at an outer portion of the ejector 7-1 to safely connect the connection parts while preventing water leakage inside the ejector 7-1.

The water level control tank 8-1 includes a water level control tank inflow water inlet 8-2 connected to the evaporator inflow water inlet 2-6 on an outer side of the evaporator 2-1. With the water level control tank 8-1, the bottom water level in the ice slurry outlet 3-5 of the freeze separation tank 3-1 and the bottom water level in the ice slurry outlet 5-5 of the salt separation tank 5-1 are maintained the same as the level of an overflow water outlet 8-3. If the bottom water level in the ice slurry outlet 3-5 of the freeze separation tank 3-1 and the bottom water level in the ice slurry outlet 5-5 of the salt separation tank 5-1 is higher than the level of the overflow water outlet 8-3, overflows occur and the overflow water is transferred to the inflow water tank 14-1 or the concentrated water tank 15-1 so that the water levels in the freeze separation tank 3-1 and the salt separation tank 5-21 are kept constant.

In the water level control tank 8-1, the water level control tank inflow water inlet 8-2 is located at a center of a lower portion of the evaporator 2-1, and the inflow water in the freeze separation tank 3-1 or the concentrated water in the salt separation tank 5-1 flows therein.

In the water level control tank 8-1, the overflow water outlet 8-3 of the water level control tank 8-1 is located at a portion of the outer peripheral surface of the evaporator 2-1, and the bottom water level in the ice slurry outlet 3-5 of the freeze separation tank 3-1 and the bottom water level in the ice slurry outlet 5-5 of the salt separation tank 5-1 are maintained the same as the level of the overflow water outlet 8-3. If the bottom water level in the ice slurry outlet 3-5 of the freeze separation tank 3-1 and the bottom water level in the ice slurry outlet 5-5 of the salt separation tank 5-1 is higher than the level of the overflow water outlet 8-3, overflows occur and the overflow water is transferred to the inflow water tank 14-1 or the concentrated water tank 15-1.

The accumulator 9-1 is located at an upstream side of the refrigerant compressor 11-1 and a downstream side of the ejector 7-1. In the accumulator 9-1, a low pressure gas ejected from the ejector 7-1 and a trace amount of low pressure liquid are separated from each other, and the liquid is accumulated and only the low-pressure refrigerant gas is transferred to the refrigerant compressor 11-1 to prevent moisture from entering the refrigerant compressor 11-1.

The gas-liquid separator 10-1 is provided between an upstream side and a downstream side of the ejector 7-1, so that the gas refrigerant flows into the lower part of the ejector 7-1, and the low-pressure liquid refrigerant is introduced through the copper refrigerant tube of the copper refrigerant tube coil type installation part 3-3 of the freeze separation tank 3-1 to separate the gaseous refrigerant and the liquid refrigerant.

The refrigerant compressor 11-1 is provided at an upstream side of the condenser 1-1 and a downstream side of the accumulator 9-1 to compress a low-pressure gas refrigerant at a high pressure.

The refrigerant ejector 12-1 is located at a downstream side and an upstream side of the condenser 1-1 and the refrigerant compressor 11-1, and converts a high-pressure liquid refrigerant into a low-pressure liquid refrigerant.

A thermometer and a pressure gauge 13-1 are installed in the condenser 1-1, the evaporator 2-1, or an external pipe to measure the temperature and pressure of the circulating water and the refrigerant.

The inflow water tank 14-1 is located on the outer side of the evaporator 2-1 and the melting tank 4-1, and temporarily stores the inflow raw water.

The concentrated water tank 15-1 is connected to the lower concentrated water outlet 3-7 of the freeze separation tank 3-1, and receives and stores the concentrated water that is not formed into ice slurry in the freeze separation tank 3-1.

Reference numeral 16-1 denotes salts that are sludge discharged from the salt separation tank 5-1 without being formed into an ice slurry.

Reference numeral 17-1 denotes the treated water discharged from the treated water outlet 4-5 of the melting tank 4-1 after the ice slurry generated in the freeze separation tank 3-1 and the salt separation tank 5-1 is transferred to the melting tank 4-1 to be melted.

Although preferred embodiments of the present disclosure have been described above, various changes, modifications and equivalents may be used in the present disclosure. It is clear that the present disclosure can be equally applied by appropriately modifying the above embodiments. Accordingly, the above description is not intended to limit the scope of the present disclosure, which is defined by the limits of the following claims.

What is claimed is:

1. A controlled-type recalcitrant high-concentration freeze-separation apparatus, comprising:

a condenser having therein a condenser stainless antifreeze tube formed in a cell and tube form, and a condenser copper refrigerant tube formed in a cell and tube form inside the stainless antifreeze tube to block direct contact between circulating water flowing into the condenser and the condenser copper refrigerant tube; and an evaporator having therein an evaporator stainless antifreeze tube formed in a form of a cell and tube inside, and an evaporator copper refrigerant tube formed in a cell and tube form inside the evaporator stainless antifreeze tube to block direct contact between circulating water flowing into the evaporator and the evaporator copper refrigerant tube, wherein an inflow water retention time is controlled by formation of circulating water between the evaporator and a freeze separation tank and circulating water between an ejector and the freeze separation tank and control of an outflow water amount from an inflow water tank, to thereby control supercooling, fine seed water generation, and ice slurry formation and melting, and wherein a concentrated water retention time is controlled by formation of circulating water between the evaporator and a salt separation tank and circulating water between the ejector and the salt separation tank and control of an outflow water amount from a concentrated water tank, to thereby control supercooling, fine seed water generation, and ice slurry formation and melting.

* * * * *